United States Patent
Kim et al.

(10) Patent No.: US 8,228,875 B2
(45) Date of Patent: Jul. 24, 2012

(54) METHOD FOR PROCESSING HANDOFF

(75) Inventors: Sung-Kee Kim, Hwaseong-si (KR);
Yun-Je Oh, Yongin-si (KR); Tae-Sung Park, Yongin-si (KR); Sung-Jea Ko, Seoul (KR); Hye-Soo Kim, Seoul (KR)

(73) Assignees: Samsung Electronics Co., Ltd (KR);
Korea University Industrial & Academic Collaboration Foundation (KR)

( * ) Notice: Subject to any disclaimer, the term of this patent is extended or adjusted under 35 U.S.C. 154(b) by 698 days.

(21) Appl. No.: 12/395,822

(22) Filed: Mar. 2, 2009

(65) Prior Publication Data

US 2009/0219892 A1   Sep. 3, 2009

(30) Foreign Application Priority Data

Feb. 29, 2008   (KR) .................. 10-2008-0019345

(51) Int. Cl.
*H04W 4/00*   (2009.01)

(52) U.S. Cl. ......... 370/332; 455/436; 455/437; 455/441

(58) Field of Classification Search .................. 370/331, 370/332, 333; 455/10, 436, 437, 441–444
See application file for complete search history.

(56) References Cited

U.S. PATENT DOCUMENTS

| | | | | |
|---|---|---|---|---|
| 5,239,667 A | * | 8/1993 | Kanai | 455/10 |
| 5,392,453 A | * | 2/1995 | Gudmundson et al. | 455/444 |
| 5,913,168 A | * | 6/1999 | Moreau et al. | 455/441 |
| 6,564,042 B1 | * | 5/2003 | Jou et al. | 455/238.1 |
| 2001/0034239 A1 | * | 10/2001 | Yamato et al. | 455/456 |
| 2002/0137515 A1 | * | 9/2002 | Igarashi et al. | 455/436 |
| 2006/0205406 A1 | * | 9/2006 | Pekonen et al. | 455/436 |

FOREIGN PATENT DOCUMENTS

| | | |
|---|---|---|
| KR | 1019980025795 | 7/1998 |
| KR | 1020070017063 | 2/2007 |
| KR | 100747902 | 8/2007 |
| KR | 1020080030238 | 4/2008 |

* cited by examiner

*Primary Examiner* — Andrew Lai
(74) *Attorney, Agent, or Firm* — The Farrell Law Firm, P.C.

(57) ABSTRACT

Provided is a handoff processing method including measuring a moving speed of a mobile terminal; measuring a size of a data packet generated in an application layer; measuring quality of a data transmission channel of the mobile terminal; calculating a maximum handoff delay time based on a relation between the moving speed and the data packet's size; estimating a handoff occurrence time point, based on a relation between a variation of the quality of the data transmission channel and the quality of the data transmission channel; and calculating a packet size and a moving speed of the mobile terminal that can minimize a delay due to a handoff occurrence by taking account of a handoff delay time according to the size of the data packet generated in the application layer and a moving speed of the mobile terminal into consideration, and providing the calculated packet size and moving speed.

8 Claims, 5 Drawing Sheets

Distance  T_ADD : Threshold to trigger transition from the neighbor RAS
T_DROP : Threshold to trigger the handoff drop timer

METHOD FOR PROCESSING HANDOFF

PRIORITY

This application claims priority to an application entitled "Method for Processing Handoff" filed in the Korean Industrial Property Office on Feb. 29, 2008 and assigned Serial No. 10-2008-0019345, the contents of which are incorporated herein by reference.

BACKGROUND OF THE INVENTION

1. Field of the Invention

The present invention relates to wireless communication technology in a mobile communication system, and more particularly to a method for processing a hand-off.

2. Description of the Related Art

In a mobile communication system, a handoff and/or a handover function, which enables a mobile terminal to maintain communication without interruption, even as the mobile terminal moves to a different place, is provided while taking the mobility of the mobile terminal into consideration.

FIG. 1 is a view illustrates handoff in a Wireless Broadband (WiBro) system, which is a mobile communication system, and FIG. 2 is a graph illustrating intensities of signals between a Radio Access Station (RAS) and wireless terminals in the WiBro system. A WiBro system, as shown in FIGS. 1 and 2, includes a plurality of RASs and an Access Control Router (ACR) for controlling the plurality of RASs, wherein a mobile terminal is referred to as a Portable Subscriber Station (PSS).

FIGS. 1 and 2 show a case where a PSS 20 performs a handoff operation from a first RAS ($RAS_1$) 10 to a second RAS ($RAS_2$) 12. Generally, a handoff is performed in such a manner that the PSS 20 continuously monitors the signal intensity between the PSS 20 and each adjacent RAS. Further, when the signal intensity between the PSS 20 and an RAS (i.e., the first RAS 10 in FIG. 1), from which the PSS 20 is currently receiving service, is dropped to a level less than or equal to a predetermined level, the PSS performs a connection to another RAS (i.e., the second RAS 12 in FIG. 2) from which a signal of a higher intensity is received. Practically, a threshold value "T_DROP", which is for determining whether the signal intensity from an RAS from which service is currently being provided is weak, and a threshold value "T_ADD", which is for determining whether the signal intensity from an adjacent RAS is strong, are set to be different from each other. Selectively, the PSS may receive service even from an adjacent RAS when the signal intensity from the adjacent RAS is equal to or greater than "T_ADD," and the PSS may cut off the connection with an RAS from which service is currently being provided when a state, in which the signal intensity from the RAS is less than or equal to "T_DROP", is continued for a predetermined period of time. An example of such a handoff technology is disclosed in Korean Patent Application No. 2006-0073726, filed on Aug. 4 2006, and which is assigned to the assignee of the present invention.

Meanwhile, in the handoff function, it is important to successfully move a call and to keep the quality of the voice information from being degraded during the handoff process. Accordingly, various methods are being attempted to enable voice information to be transferred without interruption. Also, beginning recently, various methods have been attempted in order to enable information to be transmitted without interruption not only when voice information is transmitted, but also when multimedia data is transmitted.

SUMMARY OF THE INVENTION

Accordingly, the present invention has been made to solve the above-mentioned problems occurring in the prior art, and the present invention provides a handoff processing method by which the quality of the multimedia data transmission can be enhanced.

In addition, the present invention provides a handoff processing method for reducing the delay time of a handoff by taking the relation between a data packet and the moving speed of a mobile terminal into consideration.

In accordance with an aspect of the present invention, there is provided a method for processing a handoff by a mobile terminal, the method including measuring a moving speed of the mobile terminal; measuring a size of a data packet generated in an application layer; measuring quality of a data transmission channel of the mobile terminal; calculating a maximum handoff delay time based on a relation between the measured moving speed and the measured data packet's size; estimating a time point at which a handoff is to occur, based on a relation between a variation of the quality of the data transmission channel and the quality of the data transmission channel; and calculating a packet size and a moving speed of the mobile terminal that can minimize a delay due to a handoff occurrence according to a handoff delay time determined according to the size of the data packet generated in the application layer and a moving speed of the mobile terminal, and providing the calculated packet size and the calculated moving speed.

The moving speed of the mobile terminal may be measured by a Global Positioning System (GPS) module included in the mobile terminal, or may be measured based on a change in distances between the mobile terminal and a plurality of base stations.

In measuring the quality of the data transmission channel of the mobile terminal, the quality of the data transmission channel may be measured using a transmission parameter exchanged through a transmission channel.

It is preferred that the quality of the data transmission channel of the mobile terminal is a CINR (Carrier to Interference-plus-Noise Ratio), and in estimating the time point at which the handoff is to occur, the handoff occurrence time point is estimated based on a relation between a CINR value and a variation in the CINR value in a current transmission channel.

Preferably, the packet size that can minimize delay due to the handoff occurrence corresponds to a size of a packet generated in an application domain, and the calculated packet size is provided to the application layer.

The moving speed of the mobile terminal that can minimize the delay due to the handoff occurrence, which has been obtained through the calculation, is preferably provided through a voice or image signal that can be recognized by a user.

The packet size and the moving speed that can minimize the delay due to the handoff occurrence may be calculated and estimated at the time point at which the handoff is estimated to occur.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the below description, many particular items are shown, but these are given only for providing the general understanding of the present invention. Further, detailed description of known functions and configurations incorporated herein will be omitted when it may make the subject matter of the present invention rather unclear, and it will be understood by those skilled in the art that various changes in form and detail may be made within the scope of the present invention.

Figure 1:
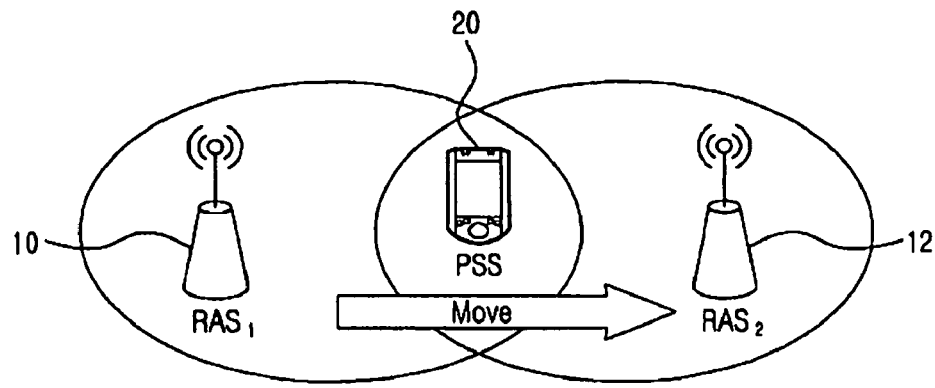
FIG. 1 is a view showing the conception of a handoff in a WiBro system, which is a mobile communication system.
Figure 2:
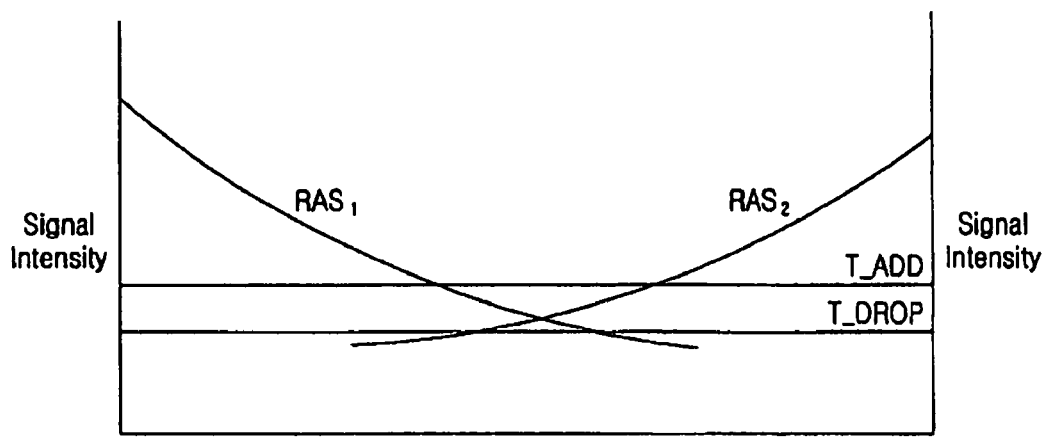
FIG. 2 is a graph illustrating the intensities of the signals between a Radio Access Station (RAS) and a wireless terminal, shown in FIG. 1.
Figure 3:
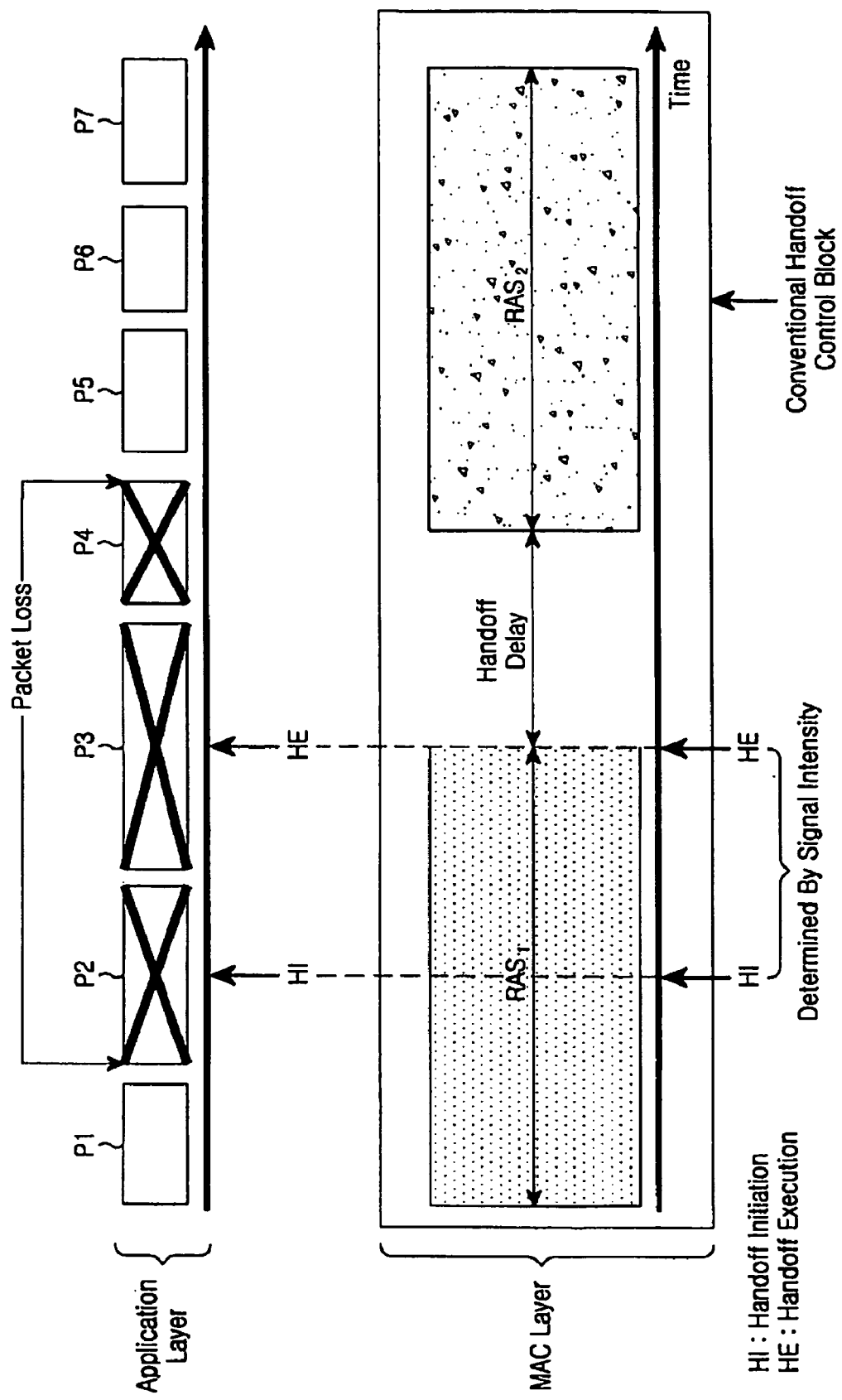
FIG. 3 is a view illustrating the relation between a Media Access Control (MAC) layer and an application layer in a handoff process.

FIG. 3 is a view illustrating the relation between a Media Access Control (MAC) layer and an application layer in a handoff process. First, problems that may occur during a general handoff process are described as follows, with reference to FIG. 3. According to the general handoff scheme, a handoff is performed using only a physical signal at a radio frequency (RF) front-end, and is performed according to the signal intensity between a wireless terminal and a neighboring base station. According to such a handoff scheme, since a handoff time point is determined by the signal intensity, important packets or frames in an application domain may be lost.

As shown in FIG. 3, the signal intensity in a MAC layer determines whether a handoff occurs, i.e., a Handoff Initiation (HI) time point and a Handoff Execution (HE) time point are set according to signal intensity, and then a handoff delay occurs for some time until the handoff has been completed. In this case, important packets or frames in the application layer may be lost. That is, in a process of successively transmitting a plurality of packets from the application layer, the second packet P2, the third packet P3, and the fourth packet P4, which are included within the period from the HI time point to the expiration time point of the handoff delay in the MAC layer, may be lost.

Figure 4A:
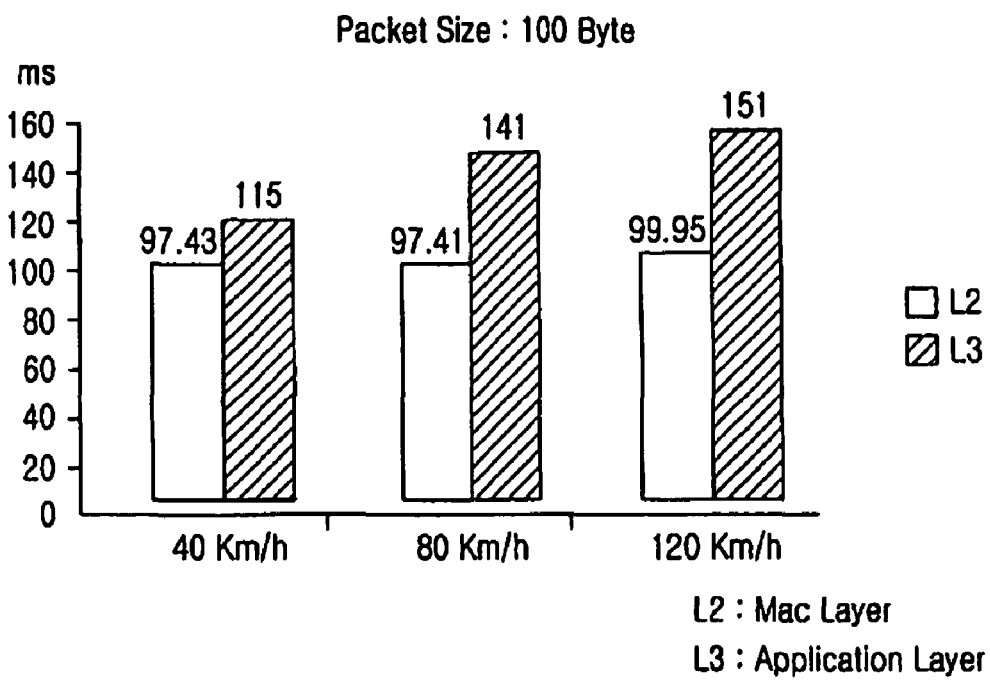
FIGS. 4A and 4B are graphs showing handoff delay times measured according to the moving speeds of mobile terminals with respect to packets of different sizes.
Figure 4B:
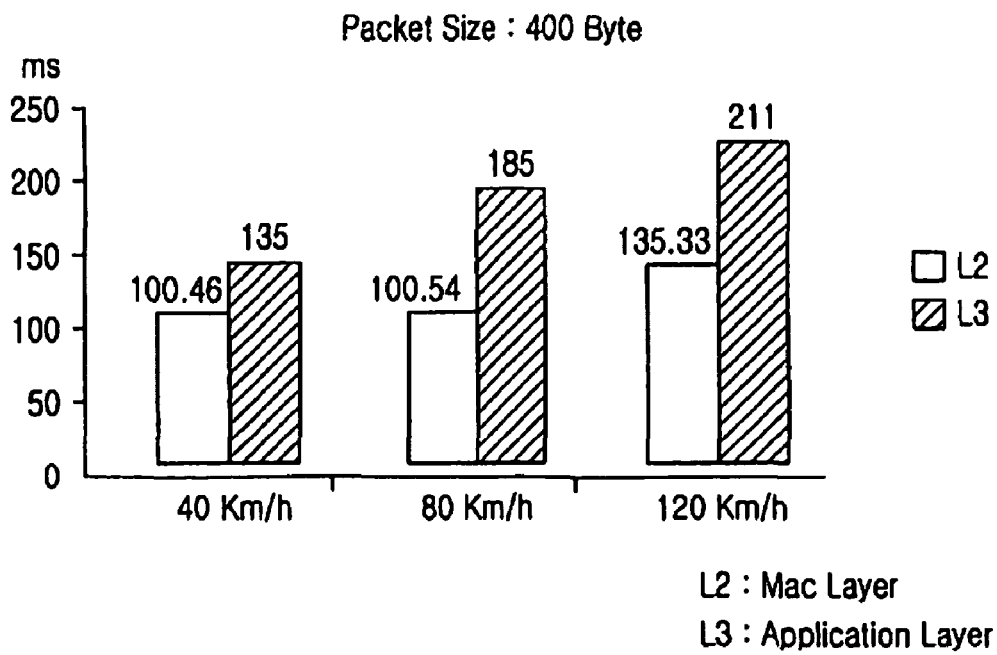

FIGS. 4A and 4B are graphs showing handoff delay times measured according to the moving speeds of mobile terminals with respect to packets of different sizes. As shown in FIGS. 4A and 4B, as the moving speed of the mobile terminal increases, the handoff delay time increases. Further, when the handoff delay times for packets of mutually different sizes are compared to each other based on a mobile terminal that moves at the same speed, it can be understood that a longer delay time corresponds to a relatively larger packet.

Therefore, the present invention proposes a method for reducing the loss of data generated in an application layer by minimizing the handoff delay time. Hereinafter, the configuration and operation of a method for minimizing the handoff delay time, by considering the relation between a packet size and the moving speed of a terminal, will be described in more detail.

Figure 5:
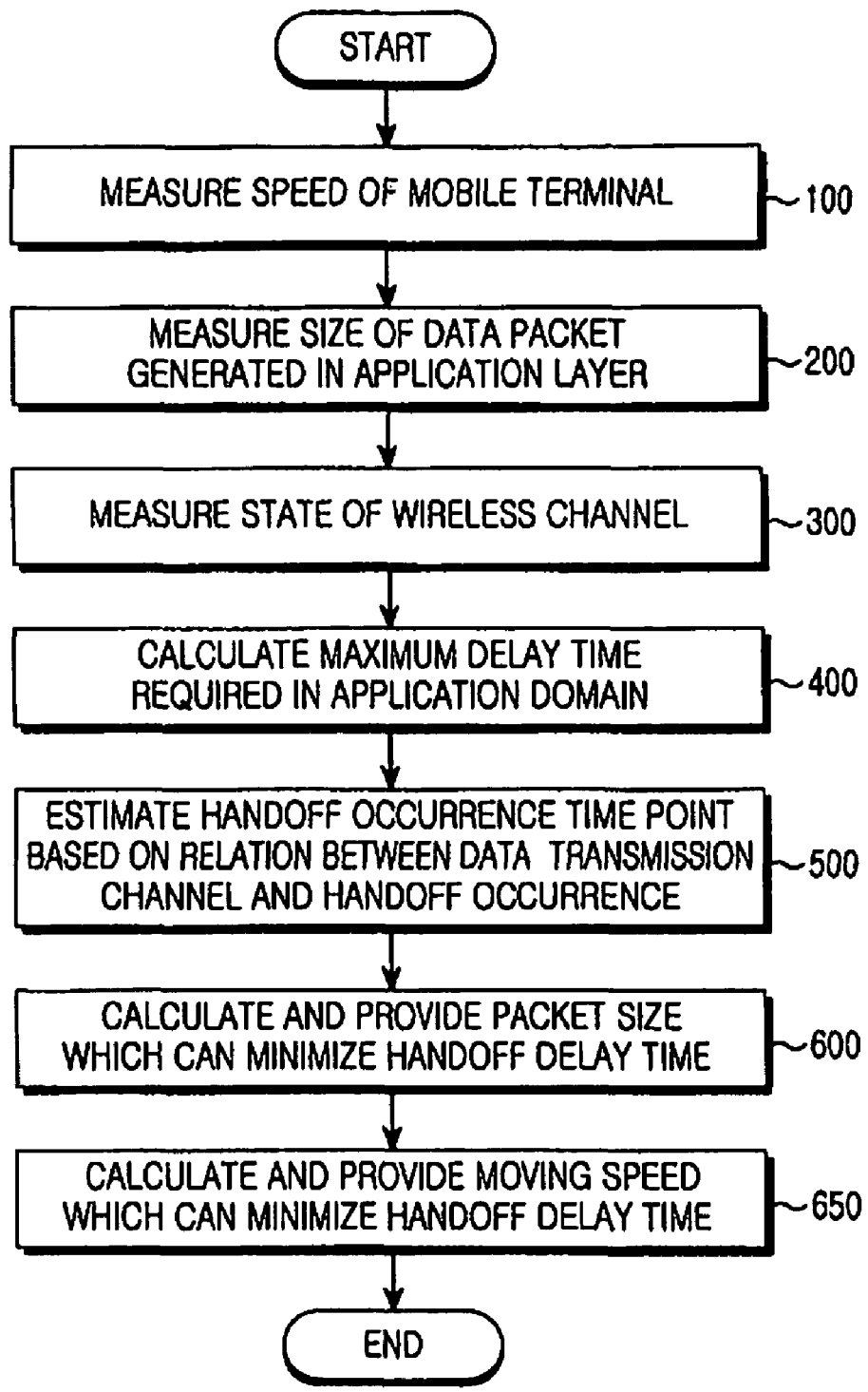
FIG. 5 is a flowchart illustrating the steps of a handoff processing method according to an exemplary embodiment of the present invention.

FIG. 5 is a flowchart illustrating the steps of a handoff processing method according to an exemplary embodiment of the present invention.

First, the moving speed of a mobile terminal is measured in step 100. In step 100, the moving speed of the mobile terminal may be measured through a Global Positioning System (GPS) module capable of measuring the position of a moving object, or may be measured by a plurality of base stations connected the mobile terminal using a Doppler frequency received from the mobile station.

Although the embodiments of the present invention have been described about the case where a GPS module is used, and the case where a plurality of base stations measures the moving speed using a Doppler frequency as the method of measuring the moving speed of a mobile terminal, the present invention is not limited thereto, any method of measuring the moving speed of a mobile terminal can be used.

In step 200, the size of a data packet generated in the application layer is measured. In step 200, any typical method of measuring the size of a data packet may be adopted.

In step 300, the state of a wireless channel connected to the mobile station is measured. Preferably, in step 300, the state of a wireless channel can be identified by using a parameter which is transmitted from a MAC layer in order to measure the quality of a wireless communication network. The parameter may include parameters included in a MAC management message exchanged through a wireless channel, e.g., a Carrier to Interference-plus-Noise Ratio (CINR) and a Received Signal Strength Indication (RSSI). Also, in step 300, the state of a wireless channel may be identified by measuring a power value, i.e., a transmission power "TxPwr" or a reception power "RxPwr," of data transmitted/received through a physical layer, or may be identified through a Head of Line (HOL), a Basic Service Set Identifier (BSSID), etc.

Although the embodiments of the present invention have been described using the cases of measuring the state of a wireless channel through the detection of a parameter, e.g., the transmission power "TxPwr," the reception power "RxPwr," a Head of Line (HOL), a Basic Service Set Identifier (BSSID), etc., which are included in a MAC management message, the present invention is not limited thereto, and various other methods capable of measuring the state of a wireless channel can be adopted.

In step 400, the maximum delay time required in the application domain is calculated based on the relation between the moving speed of a terminal and the size of a data packet. For example, first, the mobile terminal's moving speed measured in step 100, and the size of a data packet generated in the application domain, measured in step 200, are applied to Table 1 illustrated below. As a result, an approximate delay time corresponding to the moving speed and the size of the data packet is obtained. Then, the maximum delay time required in the application domain is calculated based on the obtained result. For instance, the maximum delay time may be a value obtained by rounding-up the lowest place value (e.g., the ones' place value) of the obtained approximate delay time. For example, when the size of a data packet is 1400 Bytes, and the moving speed is 120 km/h, the handoff delay time of 142 msec is obtained from Table 1. When the rounding-up operation is performed on the ones' place value of the obtained handoff delay time, the maximum delay time of 150 msec can be calculated by discarding the ones' place value and increasing the tens' place value by one.

The exemplary embodiment of the present invention has been described regarding a case where the maximum delay time is obtained by performing the rounding-up operation on the lowest place value (e.g. the ones' place value) of an approximately obtained delay time. However, the present invention is not limited thereto, and the maximum delay time can be other handoff delay values in which the relation between the moving speed and the size of a data packet is reflected.

TABLE 1

|  | 120 km/h | 80 km/h | 40 km/h |
|---|---|---|---|
| 1400 Bytes | 142 [msec] | 135 [msec] | 160 [msec] |
| 900 Bytes | 184 [msec] | 168 [msec] | 134 [msec] |
| 400 Bytes | 168 [msec] | 145 [msec] | 383 [msec] |
| 100 Bytes | 151 [msec] | 141 [msec] | 115 [msec] |

Figure 6:
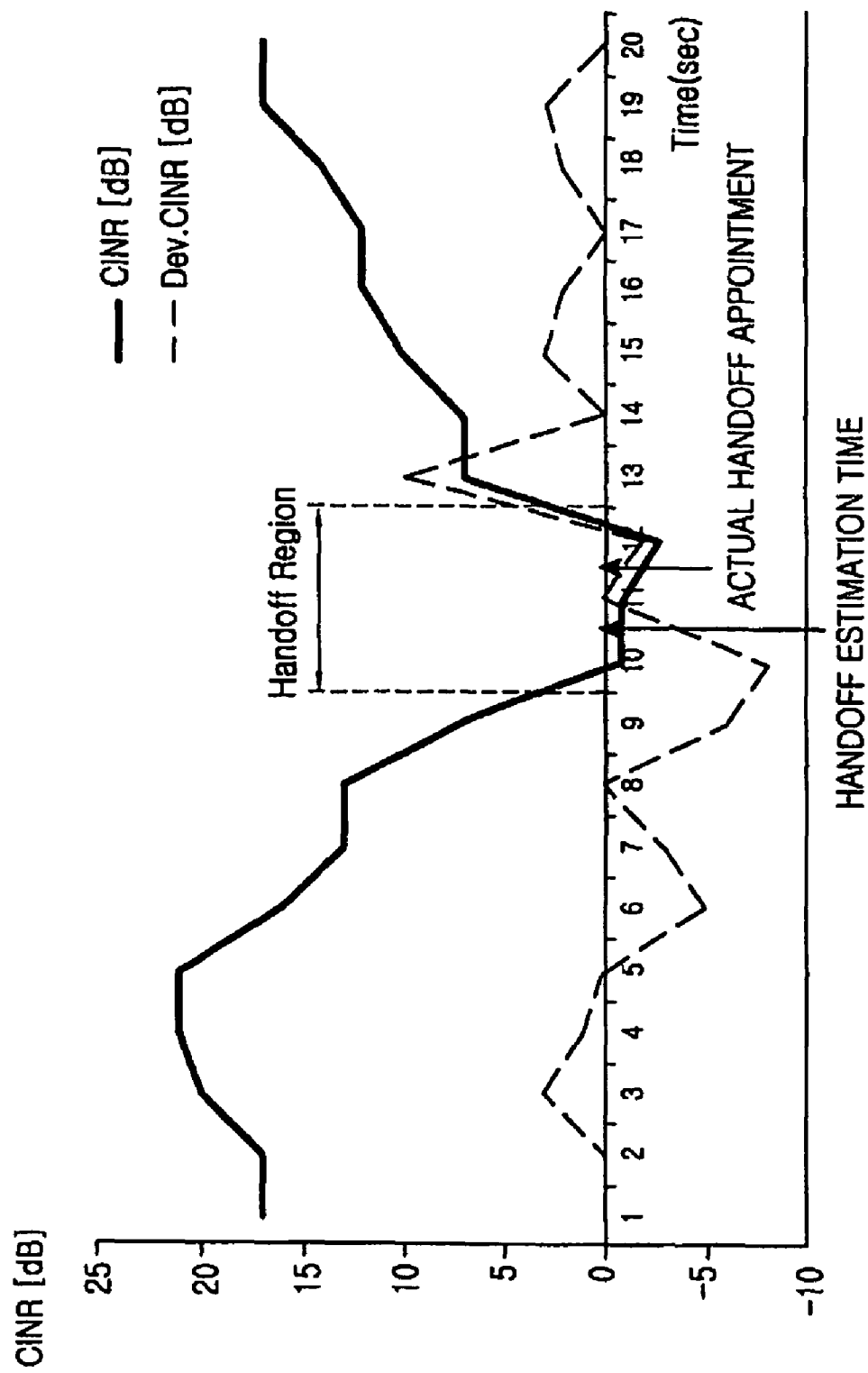
FIG. 6 is a graph showing the relation between CINR, a variation in CINR, and handoff occurrence.

In step 500, a handoff occurrence time point is estimated based on the relation between the handoff occurrence and the quality of a data transmission channel. For example, referring to FIG. 6, which shows the relation between CINR, a variation in CINR, and handoff occurrence, the CINR value is shown as a negative value at a handoff occurrence time point. Therefore, the handoff occurrence time point can be estimated by using the CINR and the variation in CINR (i.e., the differential value of CINR). In detail, a time point at which the variation in CINR (i.e., the differential value of CINR) has a value less than zero, and simultaneously a CINR value has a value less than zero, may be estimated as the handoff occurrence time point. Consequently, in step 500, the variation in CINR (i.e., the differential value of CINR) is calculated with CINR values measured in step 300, and a handoff is estimated by detecting a time point at which a CINR value has a value less than zero, while the variation in CINR (i.e., the differential value of CINR) has a value less than zero.

In step 600, by taking the handoff delay time based on the moving speed of the mobile terminal and the size of a data packet generated in the application layer into consideration, a packet size which can minimize the delay due to handoff occurrence is calculated and provided. That is, in step 600, a packet size which can reduce the delay time due to a handoff is calculated within a range not exceeding the maximum delay time determined in step 400. Also, in step 600, the packet size calculated as above is provided to the application layer.

In addition, the packet size calculated as described above may be provided to the application layer. Accordingly, in the application layer, the size of a data packet can be adjusted by selectively reflecting the provided packet size according to the characteristics (e.g., importance) of generated data packets, so that the handoff delay time can be reduced. For example, in video data, 'I' frames having little correlation with previous frames have relatively greater importance, while 'B' frames and 'P' frames have relatively lesser importance, as compared with the 'I' frames. Therefore, in the application layer, in the course of generating a data packet for an 'I' frame, it is impossible to positively reduce the size of the packet according to the packet size provided in step 600. In contrast, since 'B' frames and 'P' frames have a relatively lesser importance, it is possible to positively reduce the size of the packet according to the provided packet size, thereby efficiently reducing the handoff delay time.

Meanwhile, in step 650, by taking the handoff delay time, according to the moving speed of the mobile terminal, and the size of a data packet generated in the application layer into consideration, a moving speed for reducing the delay time is calculated and provided.

The moving speed calculated in step 650 may be converted into a voice signal or image signal, which can be recognized by the user, and may be provided to the user through a speaker or display device, included in the mobile terminal. With this voice or image signal, the user can recognize the estimated handoff occurrence time point, and move while taking the speed recommended by the mobile terminal into consideration. In addition, when the user moves at the speed recommended by the mobile terminal, the handoff delay time can be efficiently reduced.

As described above, according to the handoff processing method of the present invention, the handoff occurrence time point can be estimated based on the relation between handoff occurrence and the quality of a data transmission channel or a variation in the quality. Then, information for controlling a terminal's moving speed and a data packet size at the estimated handoff time point is generated. The information generated as above is provided to the application layer or the user, so that the application layer or the user can efficiently reduce the handoff delay time.

In addition, since the handoff delay time is minimized through the aforementioned processes, an application requiring real-time data transmission can be reliably implemented. Also, since information for controlling a terminal's moving speed and a data packet size so as to minimize the handoff delay time is provided, an environment where the network resources can be efficiently used is provided.

While the invention has been shown and described with reference to certain exemplary embodiments thereof, the invention is not limited thereto, and it will be understood by those skilled in the art that various changes in form and details may be made therein without departing from the spirit and scope of the invention as defined by the appended claims.

What is claimed is:

1. A method for processing a handoff by a mobile terminal, the method comprising the steps of:
    measuring a moving speed of the mobile terminal;
    measuring a size of a data packet generated in an application layer;
    measuring a quality of a data transmission channel of the mobile terminal;
    estimating a time point at which the handoff is to occur, based on a relation between a variation of the quality of the data transmission channel and the quality of the data transmission channel; and
    calculating a packet size and a moving speed of the mobile terminal that can minimize a delay due to the variation of the quality of the data transmission channel according to a handoff delay time determined according to the size of the data packet generated in the application layer and the moving speed of the mobile terminal, and providing the calculated packet size and the calculated moving speed.

2. The method as claimed in claim 1, wherein the moving speed of the mobile terminal is measured by a Global Positioning System (GPS) module included in the mobile terminal, or is measured based on a change in distances between the mobile terminal and a plurality of base stations.

3. The method as claimed in claim 1, wherein, in measuring the quality of the data transmission channel of the mobile terminal, the quality of the data transmission channel is measured using a transmission parameter exchanged through a transmission channel.

4. The method as claimed in claim 1, wherein, in estimating the time point at which the handoff is to occur, the handoff occurrence time point is estimated based on a relation between a Carrier to Interference-plus-Noise Ratio (CINR) value and a variation in the CINR in a current transmission channel.

5. The method as claimed in claim 1, wherein the packet size which can minimize delay due to the handoff occurrence corresponds to the size of the packet generated in an application domain.

6. The method as claimed in claim 1, wherein the packet size which can minimize delay due to the handoff occurrence is provided to the application layer.

7. The method as claimed in claim 1, wherein the moving speed of the mobile terminal that can minimize the delay due to the handoff occurrence, which has been obtained through the calculation, is provided through a voice or image signal that can be recognized by a user.

8. The method as claimed in claim 1, wherein the packet size and the moving speed that can minimize the delay due to the handoff occurrence are calculated and estimated at the time point at which the handoff is estimated to occur.

* * * * *